(12) United States Patent
Jeong et al.

(10) Patent No.: US 6,907,167 B2
(45) Date of Patent: Jun. 14, 2005

(54) OPTICAL INTERLEAVING WITH ENHANCED SPECTRAL RESPONSE AND REDUCED POLARIZATION SENSITIVITY

(75) Inventors: Hwan J. Jeong, Los Altos, CA (US); Xing Chen, San Jose, CA (US)

(73) Assignee: Gazillion Bits, Inc., San Jose, CA (US)

(*) Notice: Subject to any disclaimer, the term of this patent is extended or adjusted under 35 U.S.C. 154(b) by 959 days.

(21) Appl. No.: 09/765,544

(22) Filed: Jan. 19, 2001

(65) Prior Publication Data

US 2002/0126354 A1 Sep. 12, 2002

(51) Int. Cl.[7] .................................................. G20B 6/42
(52) U.S. Cl. ........................... 385/39; 385/24; 359/497; 398/82
(58) Field of Search ............................... 385/15, 24, 27, 385/31, 37, 39, 42; 359/495–498, 487; 398/79, 82, 147, 148

(56) References Cited

U.S. PATENT DOCUMENTS

| | | |
|---|---|---|
| 5,694,233 A | 12/1997 | Wu et al. |
| 5,808,763 A | 9/1998 | Duck et al. |
| 5,867,291 A | 2/1999 | Wu et al. |
| 5,912,748 A | 6/1999 | Wu et al. |
| 5,933,260 A | 8/1999 | Cao et al. |
| 5,953,139 A | 9/1999 | Nemecek et al. |
| 5,978,116 A | 11/1999 | Wu et al. |
| 6,040,932 A | 3/2000 | Duck et al. |
| 6,046,854 A | 4/2000 | Bhagavatula |
| 6,075,596 A | 6/2000 | Pan et al. |
| 6,125,220 A | 9/2000 | Copner et al. |
| 6,130,971 A | 10/2000 | Cao |
| 6,137,927 A | 10/2000 | Keck et al. |
| 6,141,130 A | 10/2000 | Ip |
| 6,141,467 A | 10/2000 | Doerr |
| 6,160,660 A | 12/2000 | Aina et al. |
| 6,160,932 A | 12/2000 | Huang et al. |
| 6,163,393 A | 12/2000 | Wu et al. |
| 6,498,680 B1 * | 12/2002 | Zhou et al. .................. 359/487 |

FOREIGN PATENT DOCUMENTS

| | | |
|---|---|---|
| EP | 0933657 | 4/1999 |
| EP | 1016884 | 5/2000 |
| WO | WO0101585 | 1/2000 |
| WO | WO0048055 | 8/2000 |
| WO | WO0051247 | 8/2000 |
| WO | WO0076104 | 12/2000 |

OTHER PUBLICATIONS

Benjamin B. Dingel and Masayuki Izutsu, "Multifunction optical filter with a Michelson–Gires–Tournois interferometer for wavelength–division–multiplexed network system applications", Optics Letters, Optical Society of America, vol. 23, No. 14, pp. 1099–1101, Jul. 15, 1998.

(Continued)

*Primary Examiner*—Phan T. H. Palmer
(74) *Attorney, Agent, or Firm*—Cooper & Dunham LLP

(57) ABSTRACT

An optical interleaver is described, comprising a splitting element for splitting an incident beam into a first optical signal directed along a first path and a second optical signal directed along a second path, a first resonant element positioned along the first path, a second resonant element positioned along the second path, and a combining element positioned to receive and to interferometrically combine the outputs of the first and second resonant to produce the output signal. The optical interleaver may be implemented using a free-space configuration using a beamsplitter and a plurality of resonant cavities such as asymmetric Fabry-Perot resonators or Michelson-Gires-Tournois resonators. In an alternative preferred embodiment, the optical interleaver may be implemented in a Mach-Zender-style configuration using couplers and fiber ring resonators.

47 Claims, 10 Drawing Sheets

OTHER PUBLICATIONS

Chi-hung Huang, Yuan Li, Jin Chen, Erkin Sidick, Joseph Chon, Kevin G. Sullivan and Jerry Bautista, "Low-Loss Flat Top 50-Ghz DWDM and Add/Drop Modules Using All-Fiber Fourier Filters", National Fiber Optic Engineers Conference Technical Proceedings, vol. 2, pp. 311–316, Aug. 27–31, 2000.

Arai, T. Chiba, H. Uetsuka, H. Okano and L. Man–a, "Interleave Filter With Box–like Spectral Response and Low Chromatic Dispersion," National Fiber Optic Engineers Conference Technical Proceedings, vol. 2, pp. 444–451, Aug. 27–31, 2000.

"50 GHz Compact Fiber Optical Interleaver: CF0I–050 Series," OPLINK Communications, Inc. Pub. No. CFOI–50/000104.R09, 2 pages in length, (undated).

Dutton, *Understanding Optical Communications* (Prentice Hall 1998), Contents and pp. 234–298.

* cited by examiner

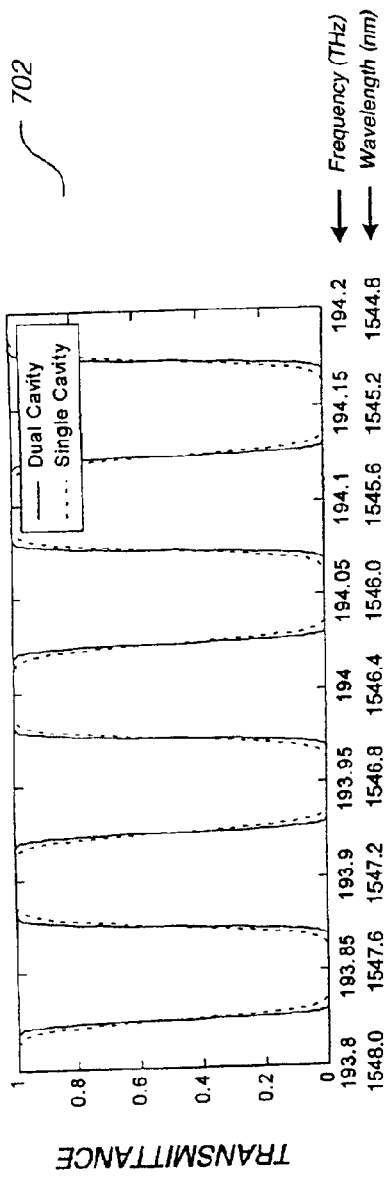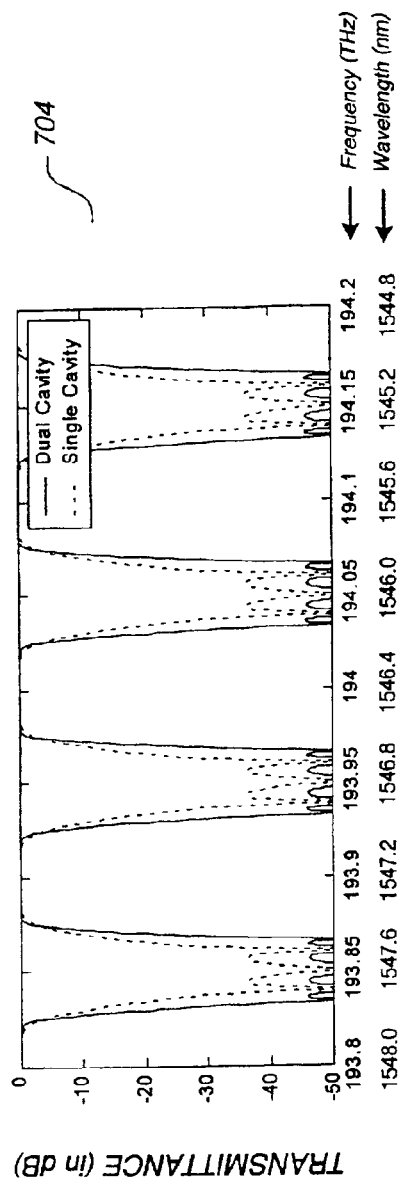
FIG. 7A
FIG. 7B

OPTICAL INTERLEAVING WITH ENHANCED SPECTRAL RESPONSE AND REDUCED POLARIZATION SENSITIVITY

FIELD

This patent specification relates to fiber optic communication systems. More particularly, it relates to optical interleaving for combining and/or separating optical signals.

BACKGROUND

As the world's need for communication capacity continues to increase, the use of optical signals to transfer large amounts of information has become increasingly favored over other schemes such as those using twisted copper wires, coaxial cables, or microwave links. Optical communication systems use optical signals to carry information at high rates over an optical path such as an optical fiber. Optical fiber communication systems are generally immune to electromagnetic interference effects, unlike the other schemes listed above. Furthermore, the silica glass fibers used in fiber optic communication systems are lightweight, comparatively low cost, and are able to carry tens, hundreds, and even thousands of gigabits per second across large distances.

Indeed, one 1998 experiment was reported in which a single optical fiber successfully transported 2,640 gigabits per second of information across a 120 km distance; see Dutton, *Understanding Optical Communications* (Prentice Hall 1998), which is incorporated by reference herein, at p. 6. According to Dutton, supra, this single optical fiber was transporting enough data to simultaneously carry the maximum number of telephone calls in existence on Earth at any particular moment in time (about 30 million calls in 1998). Most practical commercial systems operate at lower data rates, of course, although progress continues in increasing the data rate of practical optical communication systems.

Today's long-distance fiber optic communication systems generally use single-mode optical fibers to transport light at wavelengths between 1530 nm and 1570 nm in the infrared spectrum. As known in the art, the 1530–1570 nm range is the operational range of Erbium-doped fiber amplifiers (EDFAs), which are currently used in practical long-distance fiber optic communications links. Also, the 1530–1570 nm range is where current single-mode fibers have relatively low attenuation (about 0.26 dB/km). Accordingly, it is desirable to carry as much information as possible in this 1530–1570 nm wavelength band. However, known current electro-optical modulators are only capable of modulating light at a rate of about 10 GHz, corresponding to a wavelength spread of only about 0.16 nm. To efficiently use the entire 1530–1570 nm spectrum, wavelength-division multiplexing (WDM) is used, wherein a plurality of light beams are separately modulated and are then optically combined onto a single optical fiber. To maximize the use of available spectrum, as many channels as possible are multiplexed together into the 1530–1570 nm band in what are often referred to as dense wavelength-division multiplexing (DWDM) systems.

FIG. 1 shows a portion of a spectrum 102 of a typical DWDM signal, in which forty channels are spaced 50 GHz apart (0.4 nm apart) and multiplexed onto a single optical fiber. The width of each channel depends on the specific modulation scheme and modulation rate for that channel, but the channels are shown generally in FIG. 1 as having a width of about 20 GHz (0.16 nm). For increased efficiency and network throughput, it is desirable to increase the number of channels multiplexed onto the single fiber, while also retaining the ability to effectively filter out ("drop") or add in ("add") any given channel on the fiber at a given point. The ability to add and drop individual channels from a data stream is, of course, central to the construction of DWDM-based optical communication networks. In FIG. 1, for example, it is necessary to be able to filter out channel 104 without crosstalk effects from neighboring channels 106 and 108.

As international standards continue to reduce DWDM channel spacings, conventional dichroic filters used in add/drop devices have not been able to keep up in terms of the narrowness of their passband, with the known best dichroic filters only achieving effective channel separation for channel spacings of about 100 GHz or greater. To address this problem, optical interleavers have been introduced that are capable of operating on a DWDM signal carrying channels at wavelength $(\lambda_1, \lambda_2, \lambda_3, \lambda_4, \lambda_5, \lambda_6, \ldots)$ to produce two output signals carrying channels at $(\lambda_1, \lambda_3, \lambda_5, \ldots)$, and $(\lambda_2, \lambda_4, \lambda_6, \ldots)$, respectively. Because the channel spacings are now doubled, it is easier for conventional dichroic filters to operate on the signal to drop and/or add the channels of interest.

An idealized optical interleaver is shown as element 110 in FIG. 1, comprising an input port 112 for receiving the initial DWDM signal 102 and two output ports 114 and 116 for generating the output signals 118 and 120, respectively. The idealized filter function from input port 112 to output port 114 is represented by $I_{even}$ while the idealized filter function from input port 112 to output port 116 is represented by $I_{odd}$. As indicated in FIG. 1, the ideal spectral response of an optical interleaver is a perfectly square or box-like response. As described infra, practical optical interleavers will generally have passband characteristics with narrower tops and wider bottoms than the ideal.

Unless otherwise indicated, it is to be appreciated that the interleavers described herein are reciprocal devices, with the term "interleaver" representing a device that will perform "de-interleaving" when light signals are passed through in the reverse direction in accordance with optical reciprocity principles. Thus, for example, the interleaver 110 of FIG. 1 actually works as a "de-interleaver" when provided with a signal at port 112, providing the de-interleaved outputs at ports 114 and 116, and will operate as an "interleaver" when provided, for example, with the appropriate component signals at ports 112 and 116 providing the interleaved output at port 114.

FIG. 2 shows a generic spectral response characteristic 202 of one output port of a practical optical interleaver, which differs from the idealized optical interleaver 110 in that the passbands are not perfectly square. Different metrics are used to evaluate the squareness of the interleaver passbands, one such set being shown in FIG. 2. The metric $FSR_{out}$ is the free spectral range of the output, i.e., the distance between transmission peaks, which is usually twice the input channel spacing $\Delta f$. Whereas the spectral response characteristic 202 may represent the "even" output channels from a first output port, there is complementary spectral characteristic (not shown) for the "odd" channels which is similar to the curve 202 shifted by $\Delta f$. The metrics $W_{0.1\ dB}$, $W_{0.5\ dB}$, $W_{3\ dB}$, $W_{20\ dB}$, and $W_{30\ dB}$ represent the width of the spectral curve around one of the passbands of the optical interleaver at spectral power attenuations of 0.1 dB, 0.5 dB, 3 dB, 20 dB, and 30 dB, respectively, as shown in FIG. 2, and may be represented in distance (nm) or corresponding frequency (GHz) units.

For an ideal interleaver having a perfect box-like response, each of the values $W_{0.1\ dB}$, $W_{0.5\ dB}$, $W_{3\ dB}$, $W_{20\ dB}$, and $W_{30\ dB}$ would be equal to $\Delta f$. In general, the closer that all of these values are to $\Delta f$, the better the performance of the optical interleaver as there is reduced crosstalk between channels and less distortion in the passed signals. It is particularly desirable to make an optical interleaver having both $W_{0.1\ dB}$ and $W_{0.5\ dB}$ as wide as possible to create a flat passband for reduced distortion. It is also desirable to make an optical interleaver having both $W_{20\ dB}$ and $W_{30\ dB}$ as narrow as possible to reduce crosstalk between a passed channel (e.g., $\lambda_2$) and its immediately neighboring channels (e.g., $\lambda_1$ and $\lambda_3$). For comparative purposes, the values of the width metrics $W_{0.1\ dB}$, $W_{0.5\ dB}$, etc., may be normalized by the input channel spacing $\Delta f$ and/or the free spectral range $FSR_{out}$, in which case their optimal normalized values would be 1.0 and 0.5, respectively. Unless otherwise indicated, in the present disclosure the width metrics $W_{0.1\ dB}$, $W_{0.5\ dB}$, etc. will be normalized by the input channel spacing $\Delta f$.

FIG. 3 shows an optical interleaver 300 according to the prior art, in the form of a classical Michelson interferometer. Optical interleaver 300 comprises a beamsplitter 302 for dividing an incoming beam, received at an input port 301 and having WDM channels at $(\lambda_1, \lambda_2, \lambda_3, \lambda_4, \lambda_5, \lambda_6, \ldots)$, into a first beam 304 and a second beam 306, respectively, these beams being separated by 90 degrees as shown in FIG. 3. Optical interleaver 300 further comprises a first mirror 308 for receiving and reflecting the first beam 304 back to the beamsplitter 302, and a second mirror 310 for receiving and reflecting the second beam 306 back to the beamsplitter 302, to the same point on the beamsplitter 302 as the first reflected beam. The beamsplitter 302, which also operates as an optical combining device, causes the first and second beams 304 and 306 to interferometrically combine to produce a first output 312 and a second output 314. Distances $L_1$ and $L_2$ separate the beamsplitter 302 from the first mirror 308 and the second mirror 310, respectively. As known in the art, taking into account the total optical path $\Sigma L_i \eta_i$ traversed by each of the first beam 304 and second beam 306, including glass portions or other material in which i is greater than 1, the dimensions $L_1$ and $L_2$ may be selected such that, for the first output 312, constructive interference occurs for the odd wavelengths $(\lambda_1, \lambda_3, \lambda_5, \ldots)$ and destructive interference occurs for the even wavelengths $(\lambda_2, \lambda_4, \lambda_6, \ldots)$. Likewise, using these dimensions, for the second output 314 there will be constructive interference for the even wavelengths $(\lambda_2, \lambda_4, \lambda_6, \ldots)$ and destructive interference for the odd wavelengths $(\lambda_1, \lambda_3, \lambda_5, \ldots)$. The second output 314 containing the even wavelengths may then be separated from the incoming beam using a circulator (not shown).

The optical interleaver 300, however, contains several shortcomings which would limit its use as a practical interleaving device. First, it can be readily shown that the transmission response of either output, for example the even output 314, is merely a sinusoidal function having maxima at $(\lambda_2, \lambda_4, \lambda_6, \ldots)$ and minima at $(\lambda_1, \lambda_3, \lambda_5, \ldots)$. In particular, the transmission characteristic metrics defined supra would be approximately $W_{0.1\ dB}=0.19\Delta f$, $W_{0.5\ dB}=0.43\Delta f$, $W_{3\ dB}=1.00\Delta f$, $W_{20\ dB}=1.87\Delta f$, and $W_{30\ dB}=1.96\Delta f$. These values would lead to large amounts of crosstalk and signal distortion.

Moreover, the optical interleaver 300 is polarization-sensitive, the output being degraded if the incident light is partially or totally polarized. This is due to the fact that the beamsplitter 302 as configured in FIG. 3 will not perform a precise 50/50 split of incident light that is partially or totally polarized. In turn, it is this precise 50/50 split that is depended upon for proper constructive and destructive interference of the reflected beams. It has been found that even when unpolarized light is introduced into a fiber in a real-world optical fiber communication system, unwanted polarizations can arise due to many different factors, such as excessive twists or loops in the optical fiber. It is therefore required that optical interleavers be insensitive to polarizations in the incident light beam.

Finally, the optical interleaver 300 is not thermally robust, with the output degrading upon substantial temperature fluctuations sufficient to change the index of refraction of the glass (or other optical material) portions of the optical paths of beams 304 and 306. In particular, when the temperature rises and the refractive index $\eta$ of the glass portions increase, the beam 306 will be retarded by a greater amount than beam 304 because it travels through more glass than beam 304. This, in turn, disturbs the phase relationships required for proper constructive and destructive interference, degrading the operating characteristics of the optical interleaver.

Some proposals have been made for providing split-beam interferometer-based optical interleavers that provide better performance than the classical Michelson interferometer, including that discussed in WO 00/48055 ("the '055 reference"), which is incorporated by reference herein. The '055 reference discusses an optical interleaver comprising a "separator" having a surface with a 50% reflective coating oriented at what is apparently 45 degrees with respect to the incoming beam ('055 reference, FIG. 4) that splits an incoming beam into two component beams at an apparent 90 degree angle with respect to each other. The two beams are then directed in parallel to a "nonlinear split beam interferometer," with the reflected beams being recombined at the separator to produce the interleaved outputs. The "nonlinear split beam interferometer" ('055 reference, FIG. 5) comprises a cavity having a front surface of 18.5% reflectivity, a rear surface of 100% reflectivity, and a "wavelength tuning element" interposed therebetween. The cavity also comprises a "180 degree phase bias element" interposed between the reflective surfaces, along with a "90 degree phase bias element" outside the cavity that is encountered by only one of the beams.

The interleaver of the '0.55 reference, however, has several disadvantages. First, although the '0.55 reference describes the 50% reflective coating on the separator to be "polarization insensitive," it is not apparent what such material is and/or whether it can be physically realized. If not, the interleaver of the '0.55 reference would be highly polarization sensitive. It would be desirable to provide an optical interleaver having reduced polarization sensitivity that does not depend on the existence of a "polarization insensitive" reflective coating.

Second, the interleaver of the '0.55 reference will be sensitive to thermal variations. As shown in FIG. 4 therein, each split beam of the '0.55 reference encounters an identical physical distance between the separator and the cavity, with the optical path difference being created by virtue of placing glass or other solid material (the "phase bias elements") in the path of one of the beams. However, it is well known that most materials including glass will have a refractive index $\eta$ that changes with temperature, while the refractive index of air or vacuum is comparatively insensitive to thermal variations. Accordingly, the amount of optical path difference between the split beams will vary with temperature, making the interleaver of the '0.55 reference thermally sensitive and/or thermally unstable.

Third, the interleaver of the '0.55 reference comprises a cavity designed such that the split beams encounter surfaces of identical reflectivities (i.e., both beams encounter front surfaces of 18% reflectivity and rear surfaces of 100% reflectivity). While some performance improvement over the classical Michelson interferometer may be realized (e.g., a $W_{20\ dB}$ of about 1.50 of the input channel spacing versus 1.87 for the classical Michelson interferometer, see '0.55 reference, FIG. 3, plot 340), it would be desirable to provide an optical interleaver having a spectral characteristic that is closer to the ideal box-like response.

Another optical device that alters a classical Michelson interferometer is discussed in EP0933657(A2) by Dingel et al ("the '657 reference"), which is incorporated by reference herein. The '657 reference discusses a "Michelson-Gires-Tournois Interferometer (MGTI)" in which one of the reflecting mirrors of a classical Michelson interferometer of FIG. 3 is replaced by a Gires-Tournois resonator having a partially reflective front mirror and a fully reflecting back mirror. However, for reasons similar to those described supra with respect to the classical Michelson interferometer, the device of the '657 reference is sensitive to polarization of the input light. Also, the '657 reference discusses a device in which the free spectral range of the output is much greater (e.g., 30.8 nm) than that required for use as a WDM interleaver, and would fit only one passed channel in the 1530–1570 nm operational range of Erbium-doped fiber amplifiers (EDFAs). Moreover, it would be desirable to provide an optical interleaver having a spectral characteristic that is still closer to an ideal box-like response.

Accordingly, it would be desirable to provide an optical interleaver for use in optical communications systems that provides an output characteristic that is close to an ideal box-like response.

It would be further desirable to provide an optical interleaver that has reduced sensitivity to polarization of the incident light.

It would be still further desirable to provide an optical interleaver having increased thermal stability.

SUMMARY

In accordance with a preferred embodiment, an optical interleaver is provided for receiving an incident beam carrying a wavelength-division-multiplexed (WDM) signal comprising a plurality of channels at center wavelengths $\lambda_1$, $\lambda_2$, $\lambda_3$, $\lambda_4$, $\lambda_5$, $\lambda_6$, ... and generating therefrom at least one de-interleaved output signal comprising the odd channels $\lambda_1$, $\lambda_3$, $\lambda_5$, ... or the even channels $\lambda_2$, $\lambda_4$, $\lambda_6$, ... The optical interleaver comprises a splitting element for splitting an incident beam into a first optical signal directed along a first path and a second optical signal directed along a second path, a first resonant element positioned along the first path, a second resonant element positioned along the second path, and a combining element positioned to receive and to interferometrically combine the outputs of the first and second resonant elements to produce the output signal. In accordance with reciprocity principles, the optical interleaver is readily adapted to operate as an interleaver, de-interleaver, or add/drop multiplexer. It has been found that the use of two resonant elements, each operating on a separate split-beam portion of the incident beam in accordance with a preferred embodiment, provides for an improved box-like spectral response when their respective outputs are interferometrically recombined.

The optical interleaver may be implemented using a free-space configuration using a beamsplitter and a plurality of resonant cavities such as asymmetric Fabry-Perot resonators or Michelson-Gires-Tournois resonators. Preferably, the reflectivities of the inner mirrors of the two resonant cavities are different, and may be selected so as to optimize the squareness of the spectral response. In an alternative preferred embodiment, the optical interleaver may be implemented in a Mach-Zender-style configuration using couplers and fiber ring resonators. In this preferred embodiment, the coupling ratios of the fiber ring resonators are likewise different, and may likewise be selected to optimize the squareness of the box-like spectral response.

According to a preferred embodiment in which the optical interleaver is in a free-space configuration, the splitting element that receives the incident beam comprises a partially reflective surface positioned such that a normal to the reflective surface is at a less-than-30 degree angle with respect to the incoming beam. As this angle is reduced even further below 30 degrees, the optical interleaver becomes increasingly robust against polarizations in the incident light beam, because the splitting ratio of the reflective surface becomes increasingly stable as this angle is reduced. Angles of 10 degrees or less are even more preferable in providing an optical interleaver that is stable against polarizations in the incoming beam. Reducing the above splitting angle in accordance with the preferred embodiments will stabilize single-cavity optical interleavers as well as dual-cavity optical interleavers.

In accordance with another preferred embodiment, thermal stability of the optical interleaver is enhanced. In particular, the first and second paths traversed by the respective split-beam portions will each include a preliminary thickness of optical material associated with the splitting element, the first and second resonant cavities, or other optical elements. The amount of glass or other optical material in these paths may often differ depending on the nature of the components used, the free-space distances between the optical elements, and the channel spacing of the WDM signals on the incident beam. In accordance with a preferred embodiment, a compensating optical element is placed along the first or second path as required to equalize the collective thickness of optical material in the first and second paths, with any free-space distances being adjusted as required to maintain the proper optical path length difference between the first and second path. Accordingly, if the operating temperature increases and substantially changes the refractive index of the optical material, thereby changing the optical path length through the optical material, any changes in the optical paths lengths of the first and second paths will offset each other, thereby providing for a thermally stable optical interleaver.

BRIEF DESCRIPTION OF THE DRAWINGS

FIGS. 7A and 7B illustrate spectral characteristics of the outputs of the optical interleavers of FIGS. 4 and 6;

DETAILED DESCRIPTION

Figure 1:
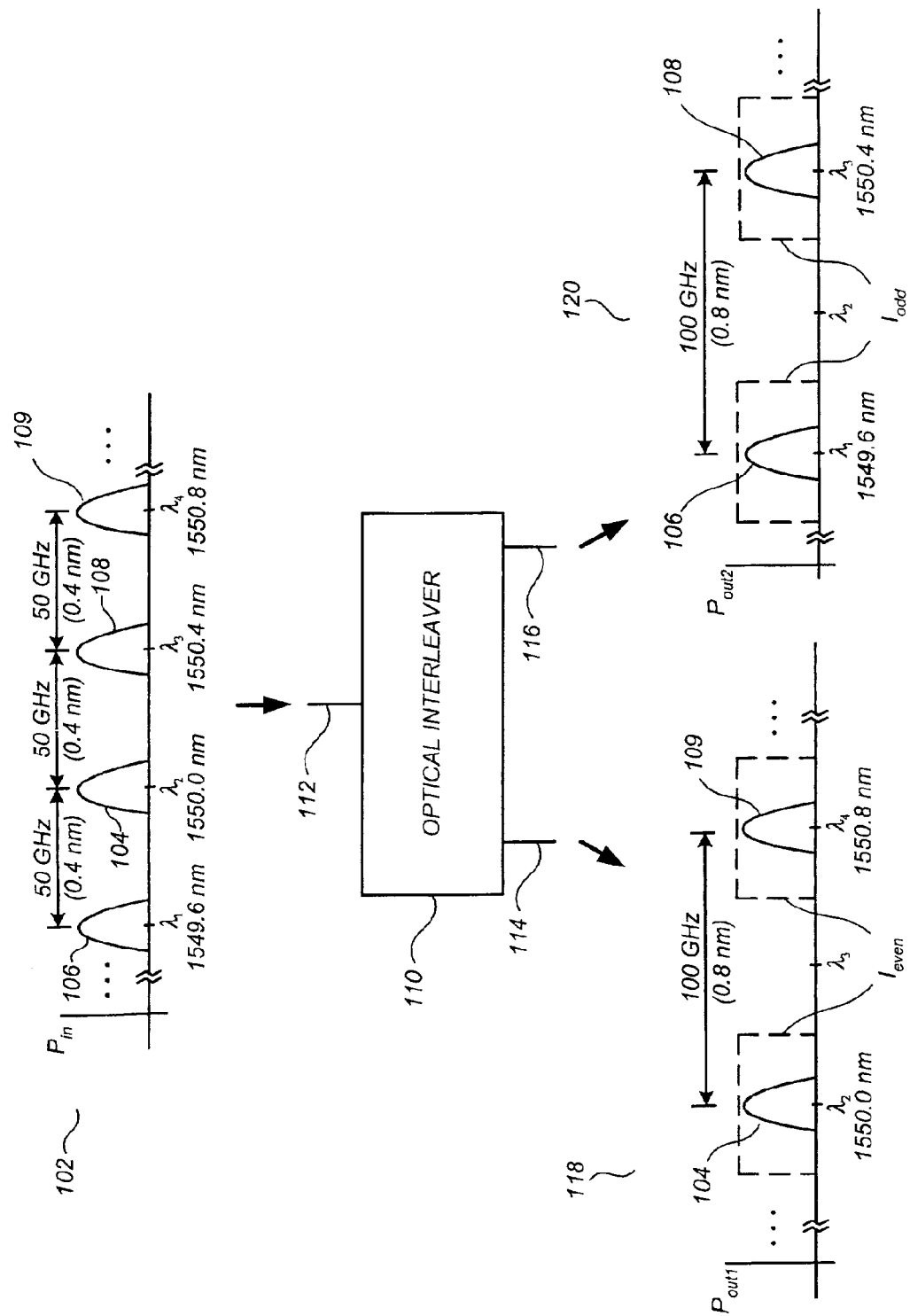
FIG. 1 shows an idealized optical interleaver and spectral characteristics of input and output signals corresponding thereto.
Figure 4:
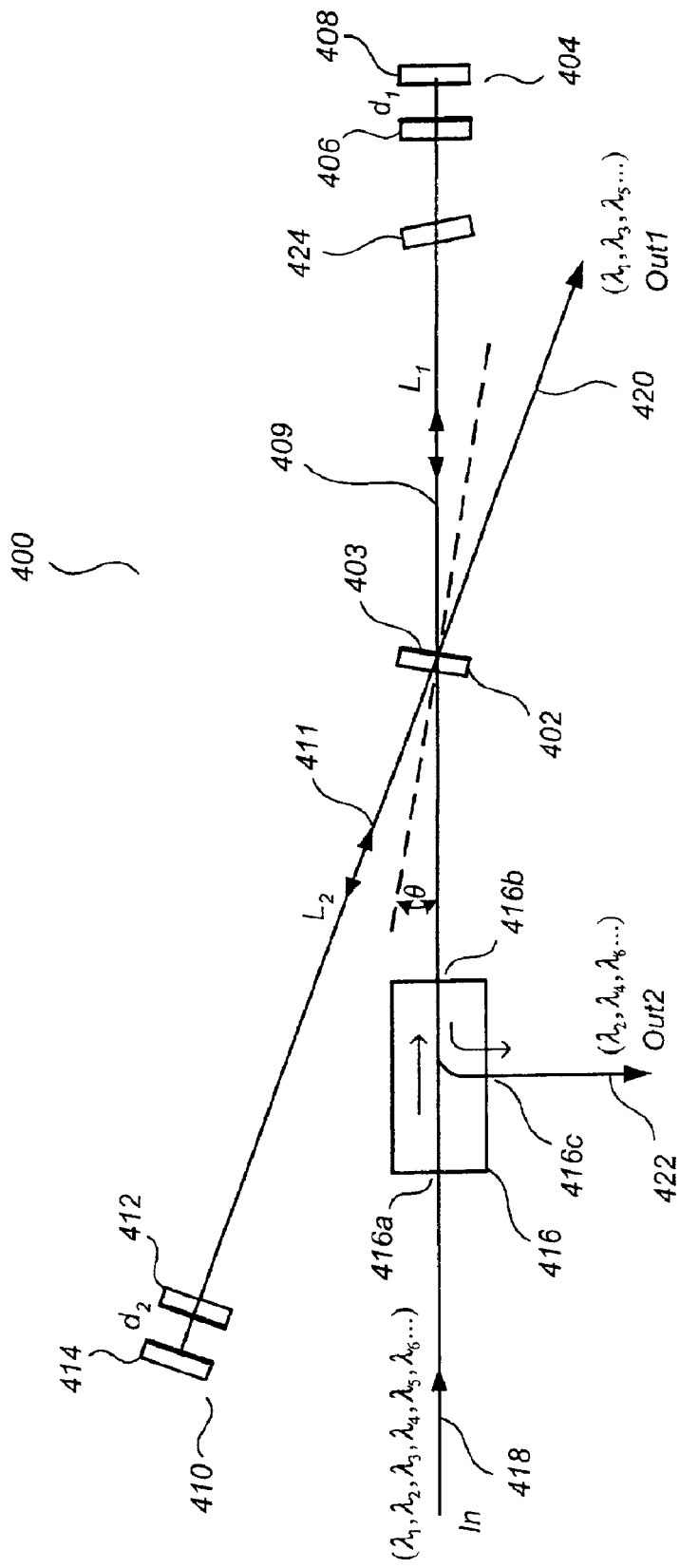
FIG. 4 illustrates a dual resonant element optical interleaver in accordance with a preferred embodiment in a de-interleaving configuration.

FIG. 4 illustrates an optical interleaver 400 in accordance with a preferred embodiment. Optical interleaver 400 comprises a beamsplitter 402 having a partially reflective surface 403, a first resonant cavity 404 having an inner mirror 406 and an outer mirror 408, a second resonant cavity 410 having an inner mirror 412 and an outer mirror 414, and a circulator 416 comprising a first port 416a, a second port 416b, and a third port 416c. At an input 418 coupled to first port 416a of circulator 416 is an incident beam containing a WDM signal comprising a plurality of channels at center wavelengths $\lambda_1, \lambda_2, \lambda_3, \lambda_4, \lambda_5, \lambda_6, \ldots$ which are usually, but not necessarily, equally spaced with a channel spacing $\Delta f$. By way of example and not by way of limitation, the channel spacing $\Delta f$ may be 50 GHz, as exemplified by plot 102 of FIG. 1, supra. At a first output 420 coupled to partially reflective surface 403 is a WDM signal comprising the odd channels at center wavelengths $\lambda_1, \lambda_3, \lambda_5, \ldots$ having a channel spacing of $2\Delta f$. Traveling back toward the input 418 is a WDM signal comprising the even channels at center wavelengths $\lambda_2, \lambda_4, \lambda_6, \ldots$ also having a channel spacing of $2\Delta f$.

Circulator 416 is included to allow the incident beam to pass through to the beamsplitter 402, while separating the returning WDM signal that comprises even channels at $\lambda_2, \lambda_4, \lambda_6, \ldots$ from the incident beam and directing it toward an output 422. Optical circulators are known in the art and are described, for example, in Dutton, supra at pp. 253–257. The components of optical interleaver 400 are preferably mounted on a low-expansion substrate (not shown) such as Zerodur from Schott Glass Technologies, Inc. of Duryea, Pa., or other suitable material.

In accordance with a preferred embodiment, resonant cavities 404 and 410 are asymmetric Fabry-Perot resonators configured as described herein. As known in the art (see, e.g., Dutton, supra at pp. 289–296), Fabry-Perot resonators generally comprise a cavity bounded on each end by a partially-silvered mirror. Alternatively, resonant cavities 404 and 410 may be Michelson-Gires-Tournois (MGT) resonators configured as described herein. As known in the art, an MGT resonator is basically an asymmetric Fabry-Perot resonator with a partially reflecting inner mirror and a 100% reflecting outer mirror, whose operation is described, for example, in Dingel and Izutsu, "Multifunction Optical Filter With a Michelson-Gires-Tournois Interferometer for Wavelength-Division-Multiplexed Network System Applications", *Optics Letters*, Optical Society of America, Vol. 23, No. 14 (Jul. 15, 1998), which is incorporated by reference herein.

As illustrated in FIG. 4, partially reflective surface 403 of beamsplitter 402 has a normal that is oriented at an angle $\theta$ with respect to the incident light beam. According to a preferred embodiment, the angle $\theta$ is less than 30 degrees, with robustness against input beam polarizations increasing even further as $\theta$ is reduced further. One limiting factor in reducing the angle $\theta$ is, of course, the finite physical size of the elements being placed on the low-expansion substrate, in light of a general design goal to make the overall optical interleaver of small size (e.g., less than a few inches per side). However, when layout conditions permit, it has been found that an angle $\theta$ of less than 10 degrees provides excellent stability against input beam polarization.

Shown in FIG. 4 as element 409 is a round-trip path traversed by a first split beam portion of the incident beam as it travels from the partially reflective surface 403, to the resonant cavity 404, and back. Shown as element 411 is a round-trip path traversed by a second split beam portion as it travels from the partially reflective surface 403, to the resonant cavity 410, and back. Distance $L_1$ represents the optical path length ($\Sigma L_i \eta_i$) traversed by the first split beam portion between the partially reflective surface 403 and the resonant cavity 404. Distance $d_1$ represents the optical path length within resonant cavity 404. Distance $L_2$ represents the optical path length ($\Sigma L_i \eta_i$) traversed by the second split beam portion between the partially reflective surface 403 and the resonant cavity 410. Finally, distance $d_2$ represents the optical path length within resonant cavity 410.

Optical interleaver 400 further comprises a compensating element 424 placed in one of the paths 409 or 411 between the beamsplitter 402 and resonant cavity 404 or 410, for providing thermal stability to the device. As known in the art, the glass or other optical material used in the beamsplitter 402, the resonant cavity 404, and the resonant cavity 410 will have indices of refraction $\eta_i$ that will change with operating temperature, thereby changing the optical path length $\Sigma L_i \eta_i$ traversed by a beam along its respective path. In accordance with a preferred embodiment, compensating optical element 424 is placed along path 409 or 411 as required to equalize the collective thickness of optical material along these paths. Importantly, free-space distances along these paths are adjusted such that the optical path lengths $L_1$ and $L_2$ satisfy the criteria described infra for proper interferometric combination of the first and second split-beam portions. Thus, if the operating temperature increases and substantially changes the refractive index of the optical material, any increases or decreases in the optical paths lengths along paths 409 and 411 will offset each other, thereby providing for a thermally stable optical interleaver.

Importantly, although the index of refraction of air will also change with temperature, in general this change is small compared to the index change in optical material. Nevertheless, the inclusion of compensating optical element 424 for enhancing thermal stability is made even more effective by hermetically sealing, and optionally evacuating, the system. In accordance with a preferred embodiment, compensating element 424 is rotatably mounted with precision adjustable mountings. This allows for precise adjustment of the amount of glass introduced into the optical path during fabrication of the optical interleaver 400, so as to precisely set the center frequencies of the passbands and to precisely equalize the optical path lengths for thermal stability. These adjustments will usually be made at the factory as predetermined test signals are passed through the optical interleaver 400.

Optical interleaver 400 operates in accordance with the equations given below. For simplicity and clarity of explanation, the following equations are directed to a configuration in which Gires-Tournois resonators are used having outer mirrors that are 100% reflective, with the variable $R_1$ representing the reflectivity of the inner mirror of the first Gires-Tournois resonator 404, and the variable $R_2$ representing the reflectivity of the inner mirror of the second Gires-Tournois resonator 410. Also used in the following equations are the following definitions: $|E_i(k)|^2$ represents the incoming beam light intensity; $|E_1(k)|^2$ represents the light intensity at output 420; $|E_2(k)|^2$ represents the light intensity at output 422; $k=(2\pi f/c)$; f=frequency of the light; and c=the speed of light in a vacuum. Finally, it is presumed that $L_2$ represents the optical path length of the longer interferometer arm, while $L_1$ represents the optical path length of the shorter interferometer arm.

$$\frac{|E_1(k)|^2}{|E_i(k)|^2} = \frac{1}{2} + \frac{1}{2}\cos\left\{2k(L_2 - L_1) - 2\tan^{-1}\left[\frac{1-\sqrt{R_1}}{1+\sqrt{R_1}}\tan(kd_1)\right] + 2\tan^{-1}\left[\frac{1-\sqrt{R_2}}{1+\sqrt{R_2}}\tan(kd_2)\right]\right\} \quad \{1\}$$

$$\frac{|E_2(k)|^2}{|E_i(k)|^2} = \frac{1}{2} - \frac{1}{2}\cos\left\{2k(L_2 - L_1) - 2\tan^{-1}\left[\frac{1-\sqrt{R_1}}{1+\sqrt{R_1}}\tan(kd_1)\right] + 2\tan^{-1}\left[\frac{1-\sqrt{R_2}}{1+\sqrt{R_2}}\tan(kd_2)\right]\right\} \quad \{2\}$$

As indicated by Eqs. (1) and (2), the optical path length difference $(L_2-L_1)$ determines the free spectral range of the output spectral response, and its value is set by Eq. (3) below, where $\Delta f$ represents the channel spacing of the input WDM signal.

$$L_2 - L_1 = \frac{c}{4\Delta f} = \frac{c}{2FSR_{out}} \quad \{3\}$$

Thus, generally speaking, the selection of the optical path length difference will depend on the input channel spacing $\Delta f$. For adjusting the shape of the output spectral response, the values of $d_1$, $d_2$, $R_1$ and $R_2$ may be optimally selected. The most desirable characteristic, as described supra, is a box-like response with a flat top and a flat bottom. In one preferred embodiment, desired output characteristics may be obtained by first selecting $d_1$ and $d_2$ in accordance with Eq. (4) below.

$$d_1 = d_2 = 2|L_2 - L_1| = c/(2\Delta f) = c/FSR_{out} \quad \{4\}$$

Also in a preferred embodiment, in order to get a response close to the desired box-like response, the reflectivity $R_2$ of the inner mirror of the Gires-Tournois resonator in the longer interferometer arm should be greater than the reflectivity $R_1$ of the inner mirror of the Gires-Tournois resonator in the shorter interferometer arm, i.e., $R_2 > R_1$. It has been found that one particularly useful set of values in the above configuration is for $R_1 = 3.3\%$ and $R_2 = 42\%$, although the scope of the preferred embodiments is not so limited. In general, it has been found that increasing the values of $R_1$ and $R_2$ will produce a more box-like passband with a flatter top and steeper sides to the response curves. However, increasing $R_1$ and $R_2$ extensively may also result in a ringing-style effect in the spectral response, resulting in increased sidelobe magnitudes that are, in turn, associated with decreased channel isolation and crosstalk.

Although the above example was given for a dual Gires-Tournois resonator implementation, it is to be appreciated that, given the present disclosure, one skilled in the art would be readily able to find suitable dimensions and surface reflectivities for more general cases using asymmetric Fabry-Perot resonators or other resonant cavities. For example, the above results are given for the computationally expedient example in which the outer mirrors of the resonant cavities are assumed to be 100%. However, it has been found that good results may be achieved even where the reflectivity of the outer mirrors falls below 100%, with good performance being realized, for example, with reflectivities greater than about 80%.

Figure 5A:
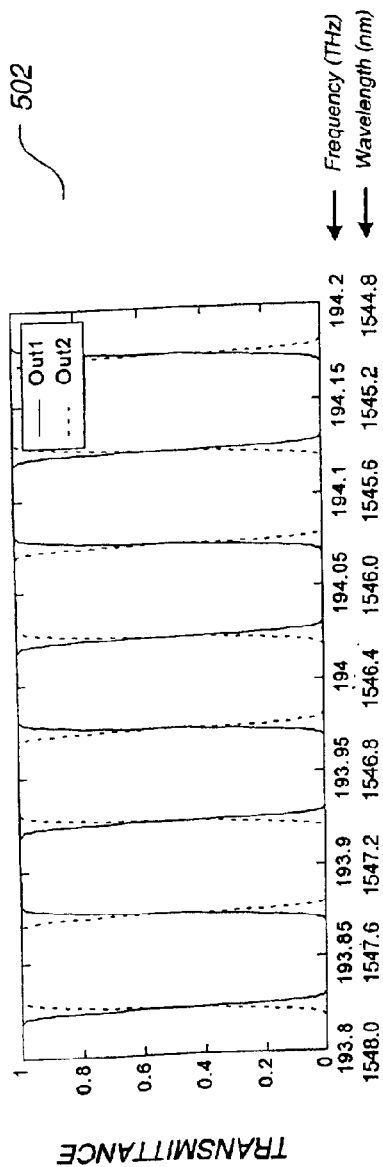
FIGS. 5A and 5B illustrate spectral characteristics of the outputs of the optical interleaver of FIG. 4.
Figure 5B:
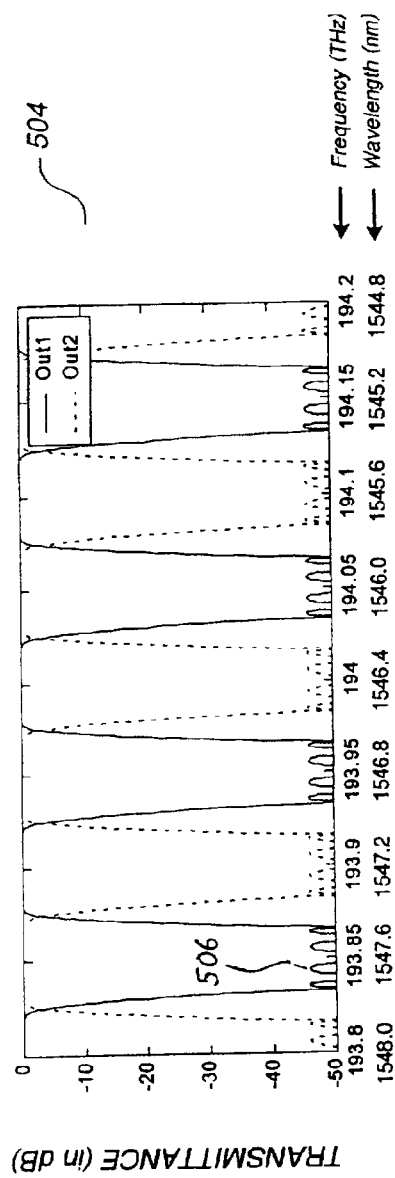

FIGS. 5A and 5B illustrate spectral characteristics of the outputs of the optical interleaver of FIG. 4, with FIG. 5A showing a plot 502 having a linear vertical axis and FIG. 5B showing a plot 504 using a logarithmic vertical axis. In particular, curve "Out1" shows the spectral response between 193.8 THz (1548.0 nm) and 194.2 THz (1544.8 nm) for the output 420 of FIG. 4, while curve "Out2" shows the corresponding response for output 422 in this range. FIGS. 5A and 5B illustrate equations (1) and (2) in graphic form and are derived therefrom. As indicated therein, a substantially improved box-like characteristic is expected to be obtained using the optical interleaver 400 based on equations (1) and (2) with the parameters described above, for a channel spacing of $\Delta f = 50$ GHz. More particularly, it can be shown that the following spectral characteristics may be realized: $W_{0.1\ dB} = 0.85\Delta f$, $W_{0.5\ dB} = 0.88\Delta f$, $W_{3\ dB} = 1.00\Delta f$, $W_{20\ dB} = 1.18\Delta f$, and $W_{30\ dB} = 1.25\Delta f$. These improved spectral characteristics in turn provide for reduced crosstalk in the output signals and reduced distortion that would be caused by a non-flat passband characteristic. It is to be appreciated that while the passbands of only four channels are shown in FIGS. 5A and 5B, the box-like response continues throughout the conventional DWDM passband of 1530–1570 nm, although the scope of the preferred embodiments is not so limited.

Also viewable in the logarithmic plot 504 of FIG. 5B are side-lobe characteristics 506 which do allow for a nonzero amount of crosstalk between neighboring channels. Generally speaking, the peak magnitude of the side lobes may serve as an isolation metric, and is less than −45 dB for the system of FIG. 4. That is, the peak response of a neighboring channel into the channel of interest is only about 0.003% or 30 ppm (parts per million) of the magnitude of the channel of interest.

Figure 6:
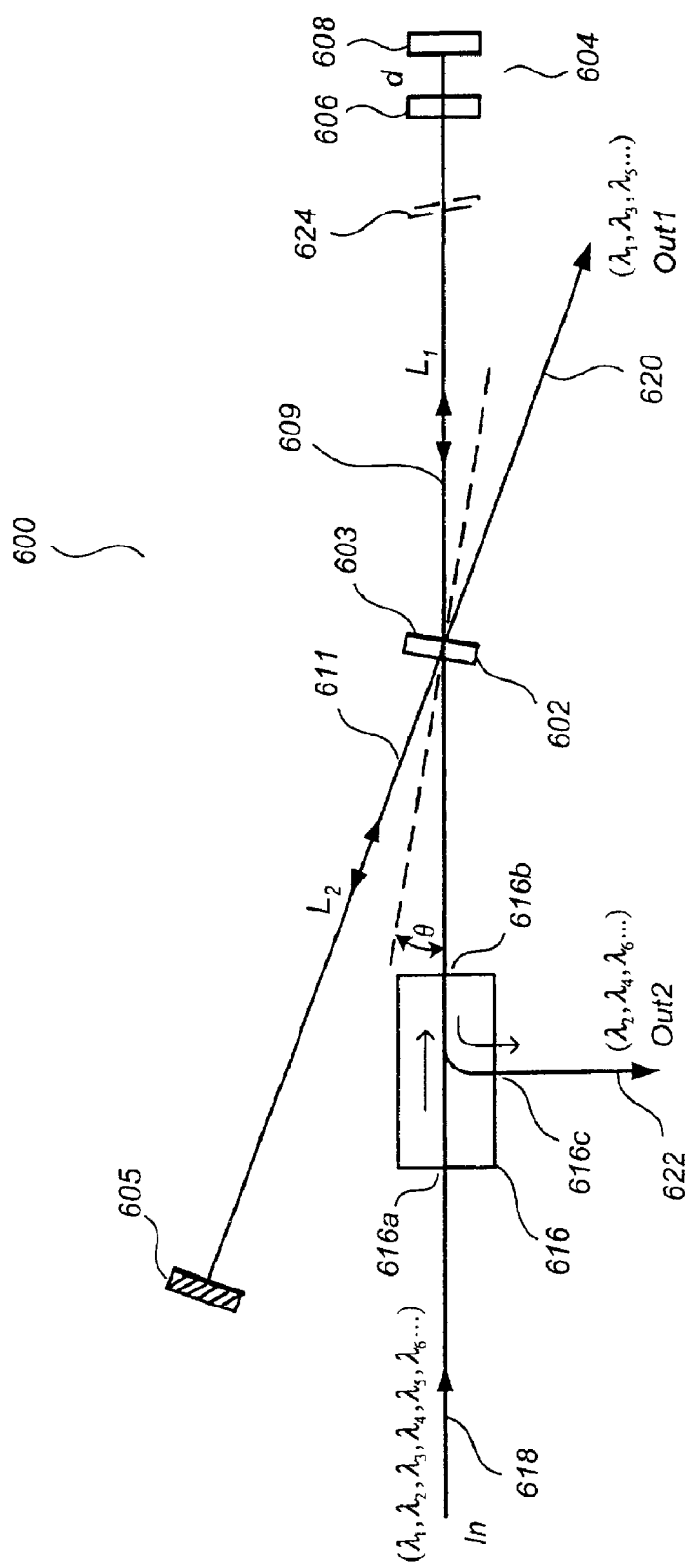
FIG. 6 illustrates a single resonant element optical interleaver in accordance with a preferred embodiment in a de-interleaving configuration.

FIG. 6 illustrates an optical interleaver 600 in accordance with another preferred embodiment, comprising an input 618, a circulator 616, a beamsplitter 602 having a partially reflective surface 603, a resonant cavity 604 having an inner mirror 606 and an outer mirror 608, first and second paths 609 and 611, an optical compensating element 624 (if necessary), and outputs 620 and 622 configured in a manner similar to like-numbered elements of optical interleaver 400 of FIG. 4. However, instead of having a resonant cavity along the path 611, optical interleaver 600 comprises a fully reflective mirror 605 positioned along path 611, thereby making the optical interleaver a single-cavity device. Although the spectral characteristics of the outputs of optical interleaver 600 are somewhat less box-like than the dual-cavity optical interleaver 400, the optical interleaver 600 nevertheless exhibits increased thermal stability due to the equalization of collective optical element thickness along the split-beam paths. Moreover, as a result of the reduced angle θ (as compared to known prior art) between the incident beam and the normal to the partially reflective surface 603, optical interleaver 600 exhibits increased robustness against polarization of the incident beam as compared to the prior art optical interleavers described supra.

FIGS. 7A and 7B illustrate comparative plots of the spectral characteristics of the outputs of the optical interleavers of FIGS. 4 and 6, with FIG. 7A showing a plot 702 having a linear vertical axis and FIG. 7B showing a plot 704 using a logarithmic vertical axis. Again, FIGS. 7A and 7B are derived from equations (1) and (2), using the parameters described below. R=0 to turn the resonant cavity into a mirror. For simplicity and clarity of disclosure, only a single output channel is shown for each system. The single-cavity plots from optical interleaver 600 use similar parameters as those given supra with respect to FIG. 4, except that the reflectivity R of the inner mirror 606 of the resonant cavity 604 is set to 15%. For an input channel spacing $\Delta f$ of 50 GHz, the resultant spectral characteristics expected to be realized by optical interleaver 600 based on equations (1) and (2) are as follows: $W_{0.1\ dB}=0.67\Delta f$, $W_{0.5\ dB}=0.80\Delta f$, $W_{3\ dB}=1.0\Delta f$, $W_{20\ dB}=1.40\Delta f$, and $W_{30\ dB}=1.52\Delta f$. In general, increasing the value of R will produce a more box-like passband with a flatter top and steeper sides to the response curves. However, similar to the dual-cavity case supra, increasing R extensively may also result in a ringing-style effect in the spectral response, resulting in increased sidelobe magnitudes that are, in turn, associated with decreased channel isolation and crosstalk.

It is to be appreciated that while the passbands of only four channels are shown in FIGS. 7A and 7B, the box-like responses continue throughout the conventional DWDM passband of 1530–1570 nm, although the scope of the preferred embodiments is not so limited. As indicated by FIGS. 7A and 7B, the dual-cavity configuration of FIG. 4 generally yields a more box-like response than the single-cavity configuration of FIG. 6. Also, the dual-cavity configuration yields better channel isolation than the single-cavity configuration (about −45 dB compared to −35 dB in this example).

Figure 8:
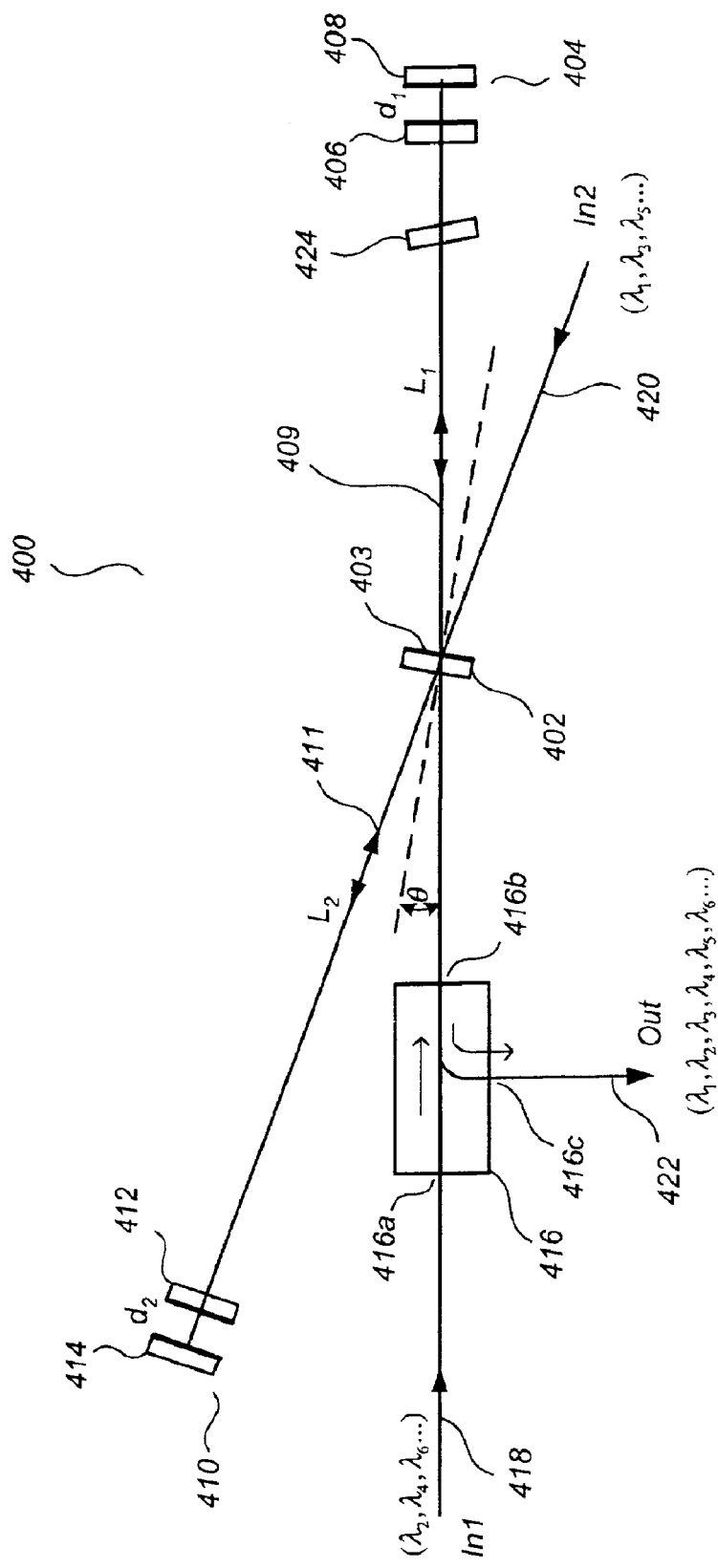
FIG. 8 illustrates an optical interleaver according to a preferred embodiment in an interleaving configuration.

FIG. 8 illustrates the optical interleaver 400 of FIG. 4 in an interleaving configuration. In accordance with reciprocity principles, the optical interleaver 400 is readily adapted to operate as an interleaver, de-interleaver, or add/drop multiplexer. Accordingly, FIG. 8 illustrates the optical interleaver 400 in an interleaving configuration, as opposed to the de-interleaving configuration of FIG. 4. This is achieved by inputting a first WDM signal having "odd" channels at wavelengths $\lambda_1, \lambda_3, \lambda_5, \ldots$ to port 420, which was formerly used as an output port in FIG. 4, these channels having a spacing of $2\Delta f$. A second WDM signal having "even" channels at wavelengths $\lambda_2, \lambda_4, \lambda_6, \ldots$ is input to port 418, these channels also having a spacing of $2\Delta f$. Like before (FIG. 4), the channels at wavelengths $\lambda_2, \lambda_4, \lambda_6, \ldots$ are transmitted back to the circulator 416 from beamsplitter 402. However, because the optical interleaver 400 is a reciprocal device, the channels at wavelengths $\lambda_1, \lambda_3, \lambda_5, \ldots$ that are provided at input 420 are now also transmitted back into the direction of the input 418 from beamsplitter 402, and are likewise intercepted by circulator 416 and provided at the output 422. Accordingly, an interleaved output comprising a plurality of channels at center wavelengths $\lambda_1, \lambda_2, \lambda_3, \lambda_4, \lambda_5, \lambda_6, \ldots$ and spaced with a channel spacing $\Delta f$ is provided at port 422.

Figure 9:
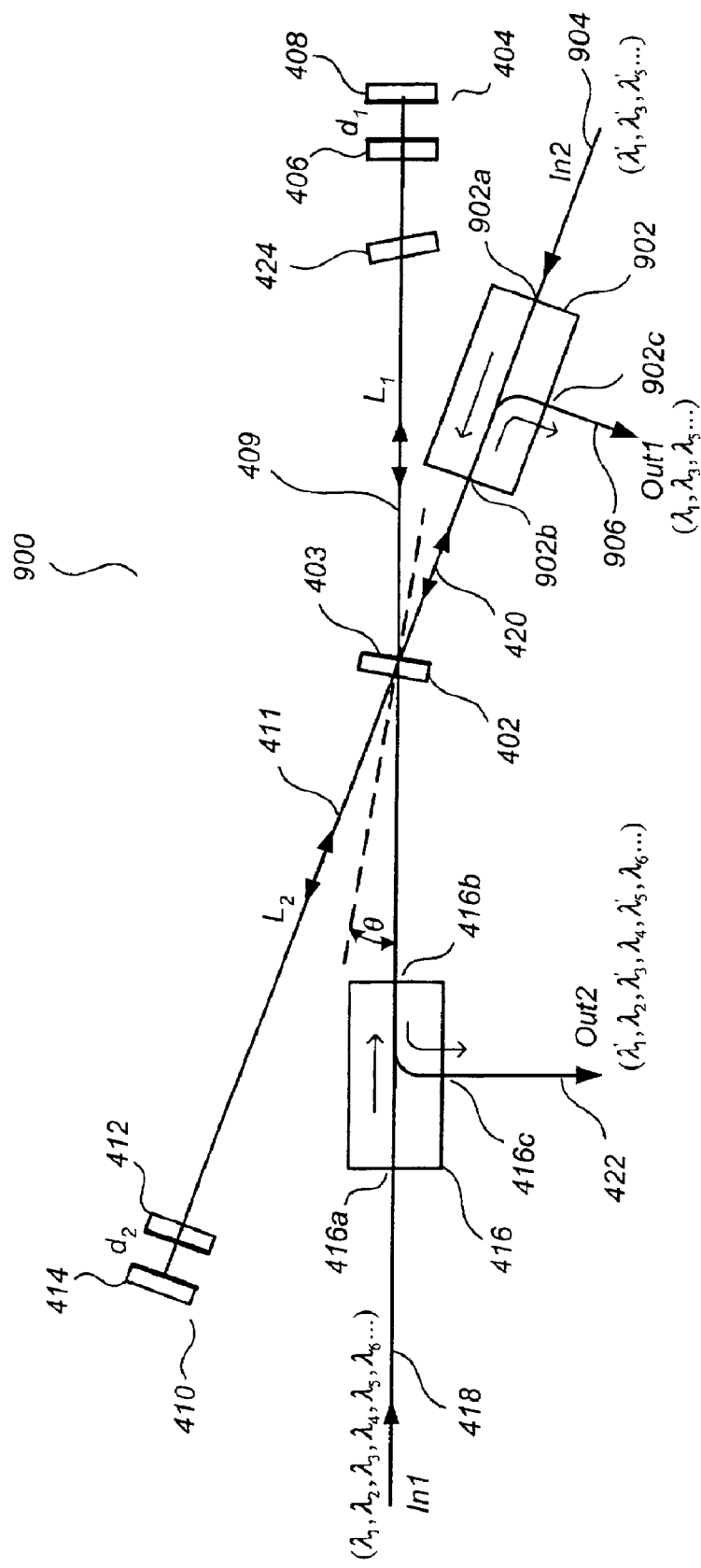
FIG. 9 illustrates an add/drop multiplexer in accordance with a preferred embodiment.

FIG. 9 illustrates an add/drop multiplexer 900 in accordance with a preferred embodiment, which is substantially identical to optical interleaver 400 of FIG. 4 except that an additional circulator 902 is coupled to the output port 420. The circulator 902 comprises a first port 902a coupled to a new input 904, a second port 902b coupled to the (former) output port 420, and a third port 902c coupled to an additional output port 906. Again in keeping with reciprocity principles, and as described by the flows shown in FIG. 9, the add/drop multiplexer 900 achieves the following functionality: (i) receiving a plurality of input channels at center wavelengths $\lambda_1, \lambda_2, \lambda_3, \lambda_4, \lambda_5, \lambda_6, \ldots$ at a first input port 418; (ii) dropping the channels centered at $\lambda_1, \lambda_3, \lambda_5, \ldots$ therefrom and providing them at the output port 906; (iii) receiving replacement channels centered at $\lambda_1, \lambda_3, \lambda_5, \ldots$ (identified as $\lambda_1', \lambda_3', \lambda_5', \ldots$) at the input port 904; and (iv) inserting the replacement channels into the original beam received at port 418 and providing the new beam comprising channels $\lambda_1', \lambda_2', \lambda_3', \lambda_4', \lambda_5', \lambda_6', \ldots$ at output port 422.

Figure 10:
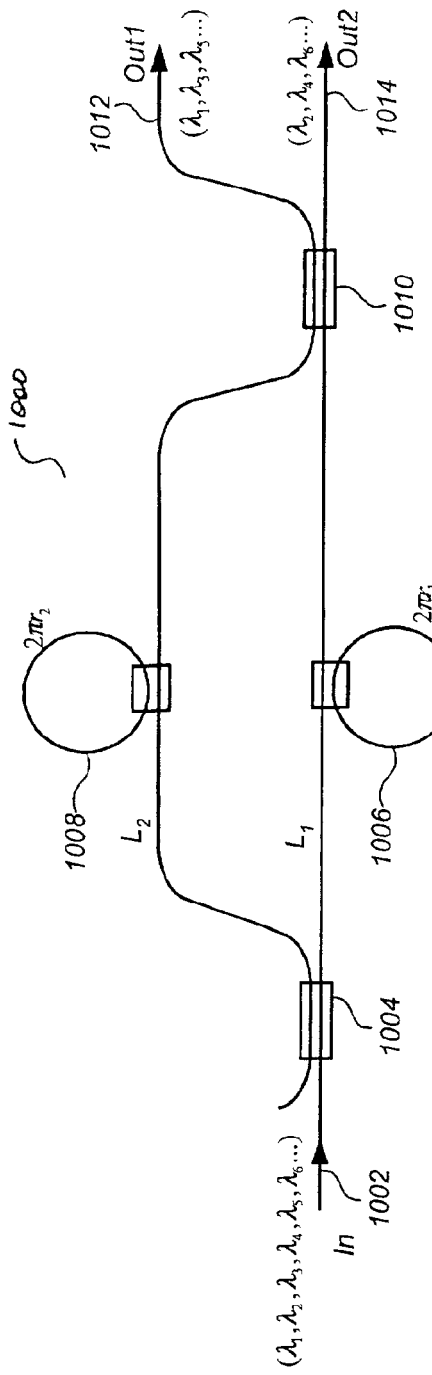
FIG. 10 illustrates a Mach-Zender implementation of a dual resonant element optical interleaver in accordance with a preferred embodiment.

FIG. 10 illustrates an optical interleaver 1000 that is a Mach-Zender implementation of a dual resonant element optical interleaver in accordance with a preferred embodiment. The Mach-Zender implementation may be of either the fiber or waveguide type. Optical interleaver 1000 comprises an input 1002, a first coupler 1004, a first fiber ring resonator 1006, a second fiber ring resonator 1008, a second coupler 1010, a first output 1012, and a second output 1014 coupled as shown in FIG. 10. Couplers, which perform splitting and combining functions analogous to the beamsplitters used in the free-space implementation, are known in the are and may include resonant couplers or other coupler types. Resonant couplers are described, for example, in Dutton, supra at pp. 234–246. Fiber ring resonators, which perform functions analogous to the resonant cavities used in free-space implementation, are also known in the art and are described, for example, in Dutton, supra at pp. 297–299. An optical path distance $L_1$ is shown in FIG. 10 between the couplers and passing through the first fiber ring resonator 1006, while an optical path distance $L_2$ is shown between the couplers and passing through the second fiber ring resonator 1008.

In accordance with a preferred embodiment for an input WDM channel spacing of $\Delta f$, the parameters $L_1$ and $L_2$ should preferably be selected such that $L_2-L_1=c/(2\Delta f)$. The coupling ratio of each of the couplers 1004 and 1010 preferably should be 50/50. The optical path length of the fiber ring resonators preferably should each be set to $2\pi r = c/(\Delta f)$. Finally, the coupling ratios of the fiber ring resonators 1006 and 1008 preferably should be set to $(1-R_1)$ and $(1-R_2)$, respectively, where $R_1$ and $R_2$ were the inner mirror reflectivities provided supra for the resonant cavities of FIG. 4. In operation, the optical interleaver 1000 may be provided with a WDM signal at input port 1002 comprising a plurality of channels at center wavelengths $\lambda_1, \lambda_2, \lambda_3, \lambda_4, \lambda_5, \lambda_6, \ldots$ having a channel spacing of $\Delta f$. At output 1012 will be a WDM signal comprising the odd channels at center wavelengths $\lambda_1, \lambda_3, \lambda_5, \ldots$ having a channel spacing of $2\Delta f$, and at output 1014 will be a WDM signal comprising the even channels at center wavelengths $\lambda_2, \lambda_4, \lambda_6, \ldots$ also having a channel spacing of $2\Delta f$. A single-ring resonator in accordance with the preferred embodiments may also be made by eliminating the fiber ring resonator in the longer optical path (i.e., the fiber ring resonator 1008) and appropriately adjusting the coupling ratio of fiber ring resonator 1006.

Figure 11:
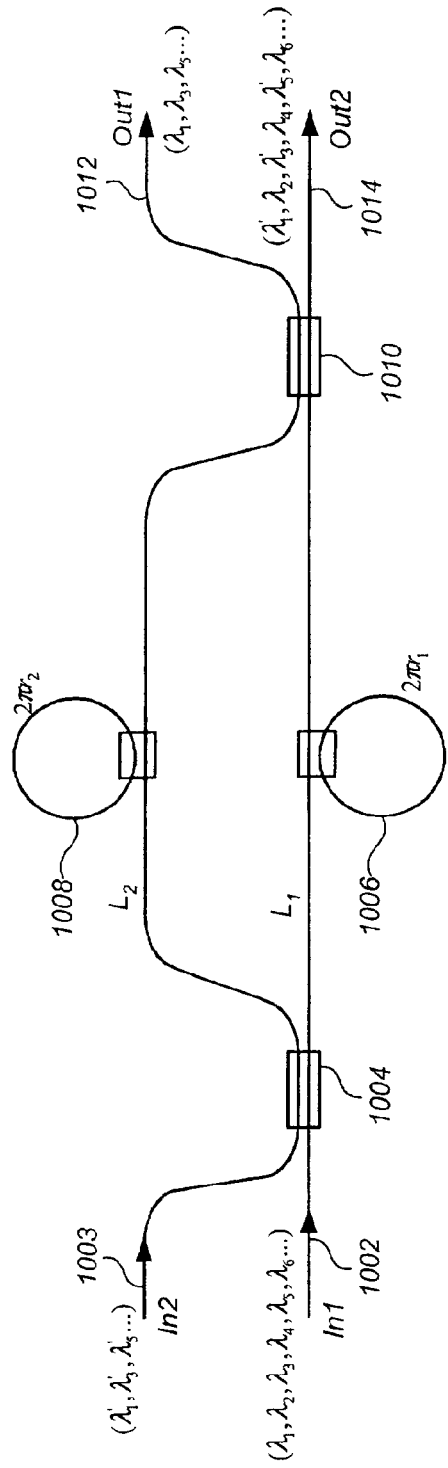
FIG. 11 illustrates a Mach-Zender implementation of a dual resonant element optical interleaver in accordance with a preferred embodiment in an add/drop multiplexer configuration.

FIG. 11 illustrates the optical interleaver 1000 of FIG. 10 in an add/drop multiplexer configuration. As illustrated in FIG. 11, when provided with an additional input 1003 into the coupler 1004, the optical interleaver 1000 may perform as an add/drop multiplexer and achieve the following functionality: (i) receiving a plurality of input channels at center wavelengths $\lambda_1, \lambda_2, \lambda_3, \lambda_4, \lambda_5, \lambda_6, \ldots$ at input port 1002; (ii) dropping the channels centered at $\lambda_1, \lambda_3, \lambda_5, \ldots$ therefrom and providing them at the output port 1012; (iii) receiving replacement channels centered at $\lambda_1, \lambda_3, \lambda_5, \ldots$ (identified as $\lambda_1', \lambda_3', \lambda_5', \ldots$) at the input port 1003; and (iv) inserting the replacement channels into the original beam received at port 1002 and providing the new beam comprising channels $\lambda_1', \lambda_2', \lambda_3', \lambda_4', \lambda_5', \lambda_6', \ldots$ at output port 1014.

Multiple optical interleavers according to the preferred embodiments may be placed in a parallel-cascade fashion to achieve even further channel configuration. For example, an input WDM signal comprising multiple channels at center wavelengths $\lambda_1, \lambda_2, \lambda_3, \lambda_4, \lambda_5, \lambda_6, \lambda_7, \lambda_8, \lambda_9, \lambda_{10}, \ldots$ spaced by $\Delta f$ may be provided to a first-stage optical interleaver to generate a first output having center wavelengths at $\lambda_1, \lambda_3, \lambda_5, \lambda_7, \lambda_9, \ldots$ spaced by $2\Delta f$ and a second output having center wavelengths at $\lambda_2, \lambda_4, \lambda_6, \lambda_8, \lambda_{10}, \ldots$, also spaced by $2\Delta f$. The first output of the first-stage optical interleaver may then be provided to a first second-stage optical interleaver to generate a third output having center wavelengths at $\lambda_1, \lambda_5, \lambda_9, \ldots$ spaced by $4\Delta f$ and a fourth output having center wavelengths at $\lambda_3, \lambda_7, \lambda_{11}, \ldots$ also spaced by $4\Delta f$, respectively. Likewise, the second output of the first-stage optical interleaver may be provided to a second second-stage optical interleaver to generate a fifth output having center wavelengths at $\lambda_2, \lambda_6, \lambda_{10}, \ldots$ spaced by $4\Delta f$ and a sixth output having center wavelengths at $\lambda_4, \lambda_8, \lambda_{12}$, etc. also spaced by $4\Delta f$. Thus, if international standards develop further to make DWDM channel spacings even more dense, conventional dichroic filters may still be employed where the DWDM signals are first provided to multiple optical interleavers in a parallel-cascade fashion that increase the channel spacings to a distance where dichroic filters are effective.

Figure 2:
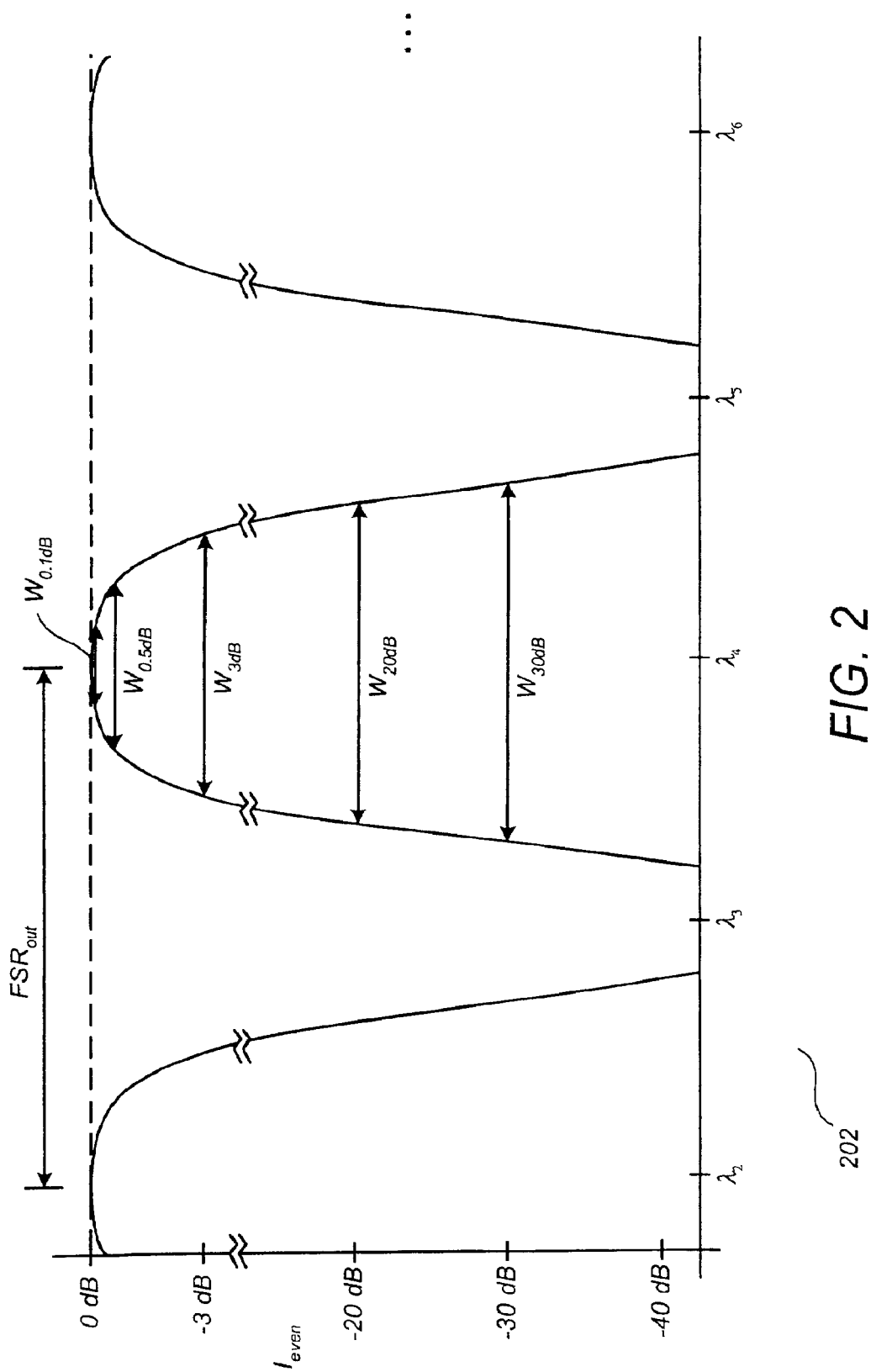
FIG. 2 shows a spectral characteristic of an output of a practical optical interleaver.
Figure 3:
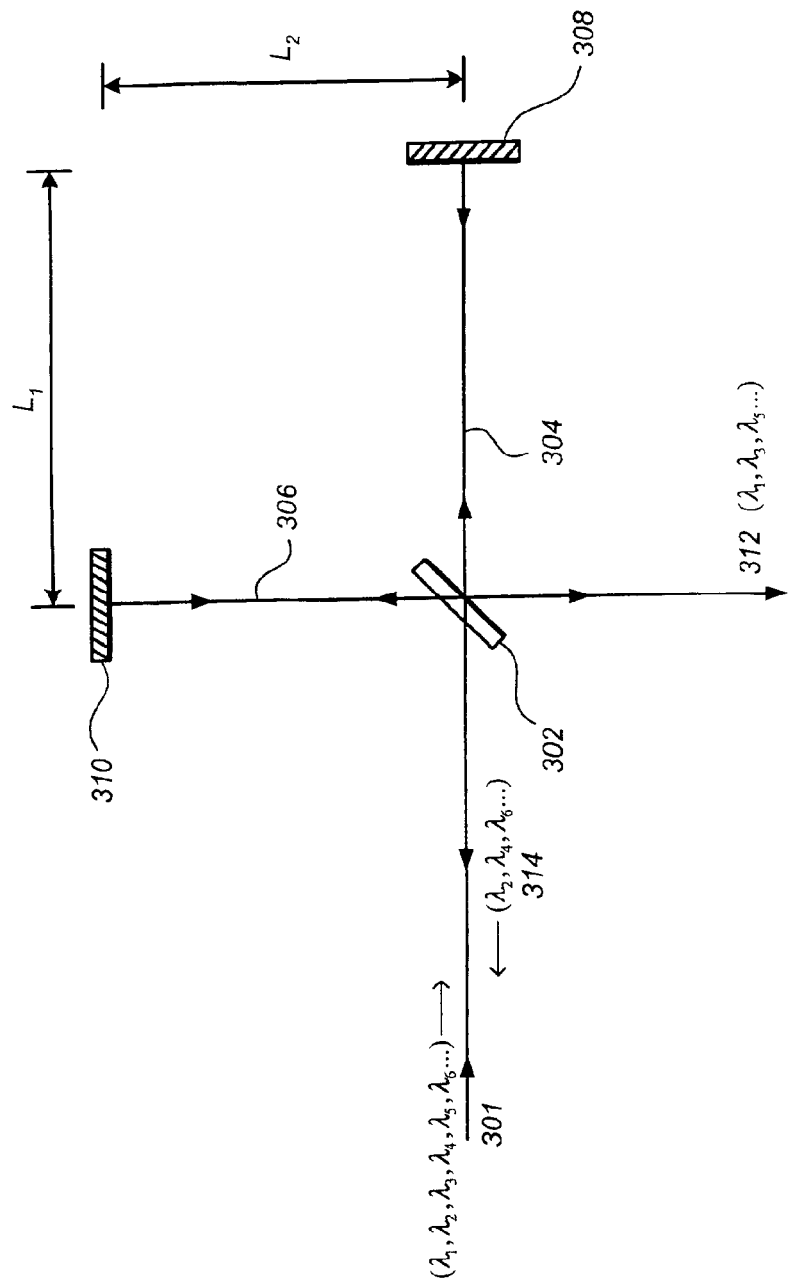
FIG. 3 shows a Michelson interferometer-based optical interleaver according to the prior art.

In the embodiments illustrated in FIGS. 4 and 6, an initial optical signal impinges at an angle substantially less than 45° on a device such as a beam splitter and divides thereby into a first and a second input optical signals. In FIG. 10, a coupler 1004 divides the initial beam. The resulting first and second input optical signals are processed in FIG. 4 by resonators 404 & 410, in FIG. 6 by resonator 604 and mirror 605, and in FIG. 10 by resonators 1006 & 1008 to thereby produce respective first and second processed optical signals. Where a resonator processes an input optical signal that has frequency band with sloping shoulders in a spectral power versus frequency plot, as is the case with the bands illustrated in FIGS. 1 & 2, the processing alters the phase of the signals such that, when interferometrically recombined, these shoulders are substantially preserved, because the passbands are more box-like such as those illustrated in FIGS. 5A, 5B, 7A and 7B. The processed optical signals are combined, such as at elements 402, 602 and 1010, to thereby produce respective first and second output optical signals. One of the output optical signals has spectral power bands that match one subset of the bands in the initial optical signal, e.g., the even-numbered bands, and the other matches another subset, e.g., the odd-numbered bands. Thus, as illustrated in FIGS. 5A and 5B for example, one of the output optical signals will have spectral power bands within those of the plot labeled "Out 1" in the figure, which transmittance bands that are generally centered at 193.8 Thz, 193.9 Thz, 194 Thz, etc. Information outside the transmission bands of the signal labeled "Out 1" is suppressed. The transmission bands of the "Out 1" plot and those of the other output ("Out 2") alternate as illustrated, and each matches a respective different subset of the bands in the initial signal.

Whereas many alterations and modifications of the present invention will no doubt become apparent to a person of ordinary skill in the art after having read the foregoing description, it is to be understood that the particular embodiments shown and described by way of illustration are in no way intended to be considered limiting. As a non-limiting example, in view of the principles described above, it would be within the scope of the preferred embodiments to provide an optical interleaver in which more than one resonant cavity is placed in each split beam path. Therefore, reference to the details of the preferred embodiments are not intended to limit their scope, which is limited only by the scope of the claims set forth below, as they may be amended before the grant of a patent.

What is claimed is:

1. An optical interleaver, comprising:
   a splitting element for splitting an incident beam into a first optical signal directed along a first path and a second optical signal directed along a second path;
   a first resonant element positioned along said first path for receiving and filtering said first optical signal and producing a first filtered signal therefrom;
   a second resonant element distinct from said first resonant element positioned along said second path for receiving and filtering said second optical signal and producing a second filtered signal therefrom; and
   a combining element for combining said first filtered signal and said second filtered signal so that they interfere to produce an output signal.

2. The optical interleaver of claim 1, wherein said splitting element and said combining element are couplers, wherein said first and second paths comprise optical fibers or waveguides, and wherein said first and second resonant elements comprise fiber ring resonators or waveguide ring resonators.

3. The optical interleaver of claim 2, wherein said first path has an optical path length corresponding to a first amount of optical fiber or waveguide positioned between said splitting element and said combining element and its associated index of refraction, and wherein said second path has an optical path length corresponding to a second amount of optical fiber or waveguide positioned between said splitting element and said combining element and its associated index of refraction.

4. The optical interleaver of claim 3, said incident beam comprising a wavelength-division multiplexed (WDM) optical signal with a plurality of channels separated by an input channel spacing $\Delta f$, wherein the difference between the optical path lengths of said first and second paths is approximately equal to $c/(2\Delta f)$, whereby said output signal has a free spectral range of $2\Delta f$.

5. The optical interleaver of claim 4, wherein each of said first and second fiber ring resonators has an optical path that is twice the difference between the optical path lengths of said first and second paths.

6. The optical interleaver of claim 5, wherein a coupling ratio of said first fiber ring resonator is greater than 70%, and wherein a coupling ratio of said second fiber ring resonator is greater than 40%.

7. The optical interleaver of claim 6, wherein the coupling ratio of said first fiber ring resonator is greater than 95%, and wherein a coupling ratio of said second fiber ring resonator is greater than 55%.

8. The optical interleaver of claim 1, wherein said first and second resonant elements each comprise an inner surface and an outer surface, said inner surface being positioned closer to said splitting element than said outer surface, said inner surface being partially reflective, and said outer surface being at least partially reflective.

9. The optical interleaver of claim 8, said first resonant element being placed a first distance from said splitting element, said second resonant element being placed a second distance from said splitting element different than said first distance, wherein said first and second paths each comprise an identical collective thickness of optical material.

10. The optical interleaver of claim 9, wherein said first path has an optical path length equal to two times the sum of (i) an optical path length between said splitting element and said first resonator, and (ii) an optical path length of said first resonator, and wherein said second path has an optical path length equal to two times the sum of (i) an optical path length between said splitting element and said second resonator, and (ii) an optical path length of said second resonator.

11. The optical interleaver of claim 10, said incident beam comprising a wavelength-division multiplexed (WDM) optical signal with a plurality of channels separated by an input channel spacing $\Delta f$, wherein the difference between (a) said optical path length between said splitting element and said second resonator, and (b) said optical path length between said splitting element and said first resonator is approximately equal $c/(4\Delta f)$, whereby said output signal has a free spectral range of $2\Delta f$.

12. The optical interleaver of claim 11, wherein said optical path length of said first resonator and said optical path length of said second resonator are each approximately two times said difference between (a) said optical path length between said splitting element and said second resonator, and (b) said optical path length between said splitting element and said first resonator.

13. The optical interleaver of claim 9, said first and second paths each including a preliminary thickness of optical material associated with said splitting element and said first and second resonant elements, said optical interleaver further comprising a compensating optical element placed along said first or second path to equalize the collective thickness of optical material in said first and second paths.

14. The optical interleaver of claim 8, wherein said first and second resonant elements each comprise an asymmetric Fabry-Perot resonator.

15. The optical interleaver of claim 14, wherein said first and second resonant elements each comprise a Michelson-Gires-Tournois resonator.

16. The optical interleaver of claim 8, wherein said inner surface of said first resonant element has a reflectivity of less than 30%, wherein said inner surface of said second resonant element has a reflectivity of less than 60%, and wherein said outer surfaces of said first and second resonant elements each have a reflectivity above 80%.

17. The optical interleaver of claim 8, wherein said inner surface of said first resonant element has a reflectivity near 3%, wherein said inner surface of said second resonant element has a reflectivity near 42%, and wherein said outer surfaces of said first and second resonant elements each have a reflectivity near 100%.

18. The optical interleaver of claim 8, said splitting element comprising a partially reflective surface for splitting the incident beam, wherein said splitting element is positioned such that a normal to said partially reflective surface thereof forms an angle of less than 30 degrees with respect to a path of the incident beam, whereby said optical interleaver has reduced sensitivity to a polarization state of the incident beam.

19. The optical interleaver of claim 18, wherein said angle between said normal and said path of the incident beam is less than 10 degrees.

20. The optical interleaver of claim 1, wherein said splitting element also serves as said combining element.

21. An optical interleaver for receiving an incident beam comprising a wavelength-division multiplexed (WDM) optical signal with a plurality of channels separated by an input channel spacing $\Delta f$ and for generating an output signal therefrom, comprising:

a splitting element for splitting the incident beam into a first optical signal directed along a first path and a second optical signal directed along a second path;

a resonant element positioned along said first path for receiving and filtering said first optical signal and producing a filtered signal therefrom, said resonant element comprising a partially reflective inner surface and an at least partially reflective outer surface, said inner surface being positioned closer to said splitting element than said outer surface;

a mirror element positioned along said second path for receiving and reflecting said second optical signal and producing a reflected signal therefrom; and a combining element for combining said filtered signal and said reflected signal to produce the output signal;

wherein said optical interleaver is configured and dimensioned such that a difference between (a) an optical path length traversed by said first optical signal between said splitting element and said resonant element, and (b) an optical path length traversed by said second optical signal between said splitting element and said mirror element is approximately equal to $c/(4\Delta f)$, and wherein said optical interleaver is configured and dimensioned such that an optical path length between said inner surface and said outer surface of said resonant element is greater than or equal to $c/(2\Delta f)$.

22. The optical interleaver of claim 21, said splitting element comprising a partially reflective surface for splitting the incident beam, wherein said splitting element is positioned such that a normal to said partially reflective surface forms an angle of less than 30 degrees with respect to a path of the incident beam, whereby said optical interleaver has reduced sensitivity to a polarization state of the incident beam.

23. The optical interleaver of claim 22, wherein said angle between said normal and said path of the incident beam is less than 10 degrees.

24. The optical interleaver of claim 23, said first and second paths each including a preliminary thickness of optical material associated with said splitting element, said resonant element, and said mirror element, said optical interleaver further comprising a compensating optical element placed along said first or second path to equalize the collective thickness of optical material in said first and second paths, whereby said optical interleaver is robust against thermal variations.

25. An optical interleaver, comprising:

a splitting element for splitting an incident beam into a first optical signal directed along a first path and a second optical signal directed along a second path, said splitting element comprising a partially reflective surface for splitting the incident beam;

a resonant element positioned along said first path for receiving and filtering said first optical signal and producing a filtered signal therefrom;

a mirror element positioned along said second path for receiving and reflecting said second optical signal and producing a reflected signal therefrom; and a combining element for combining said filtered signal and said reflected signal to produce the output signal;

wherein said splitting element is positioned such that a normal to said partially reflective surface forms an angle of less than 30 degrees with respect to a path of the incident beam, whereby said optical interleaver has reduced sensitivity to a polarization state of the incident beam.

26. The optical interleaver of claim 25, wherein said angle between said normal and said path of the incident beam is less than 10 degrees.

27. The optical interleaver of claim 26, said first and second paths each including a preliminary thickness of optical material associated with said splitting element, said resonant element, and said mirror element, said optical interleaver further comprising a compensating optical element placed along said first or second path to equalize the collective thickness of optical material in said first and second paths, whereby said optical interleaver is robust against thermal variations.

28. The optical interleaver of claim 27, wherein said splitting element also serves as said combining element.

29. The optical interleaver of claim 28, said incident beam comprising a wavelength-division multiplexed (WDM) optical signal with a plurality of channels separated by an input channel spacing $\Delta f$, wherein said optical interleaver is configured and dimensioned such that a difference between (a) an optical path length traversed by said first optical signal between said splitting element and said resonant element, and (b) an optical path length traversed by said second optical signal between said splitting element and said mirror element is approximately equal to $c/(4\Delta f)$, whereby said output signal has a free spectral range of $2\Delta f$.

30. The optical interleaver of claim 29, said resonant element comprising a partially reflective inner surface and an at least partially reflective outer surface, said inner surface being positioned closer to said splitting element than said outer surface, wherein said optical interleaver is configured and dimensioned such that an optical path length between said inner surface and said outer surface of said resonant element is greater than or equal to $c/(2\Delta f)$.

31. A method for filtering an input beam comprising a wavelength-division multiplexed (WDM) optical signal, comprising the steps of:
  splitting the input beam into a first beam and a second beam;
  directing the first beam along a first path that includes a first resonant cavity;
  directing the second beam along a second path that includes a second resonant cavity distinct from said first resonant cavity; and
  interferometrically combining said first and second beams to produce an output beam.

32. The method of claim 31, said step of splitting the input beam comprising the step of directing the input beam to a partially reflective surface oriented such that said first beam and said input beam form an angle that is less than 60 degrees.

33. The method of claim 32, said WDM signal comprising "n" channels having center wavelengths at $\lambda_1, \lambda_2, \lambda_3, \lambda_4$, etc., and a channel spacing of $\Delta f$ in Hz, wherein an optical path length traversed by said first beam along said first path differs from an optical path length traversed by said second beam along said second path such that, upon said step of interferometrically combining, said output beam comprises a plurality of channels having center wavelengths at $\lambda_1, \lambda_3, \lambda_5$, etc., and a free spectral range of $2\Delta f$ in Hz.

34. The method of claim 33, wherein said first and second resonant cavities each comprise an asymmetric Fabry-Perot resonator having an inner mirror of reflectivity R1, and an outer mirror of reflectivity R2, said inner mirror being positioned closer to said partially reflective surface than said outer mirror.

35. The method of claim 34, wherein said first and second resonant cavities comprise substantially identical optical path lengths between their respective inner and outer mirrors.

36. The method of claim 35, wherein said substantially identical optical path length is approximately equal to $c/(2\Delta f)$.

37. The method of claim 34, wherein said inner mirror of said first resonant cavity has a reflectivity of less than 30%, and wherein said inner mirror of said second resonant cavity has a reflectivity of less than 60%.

38. The method of claim 37, wherein said outer mirrors of said first and second resonant cavities each have a reflectivity of greater than 80%.

39. The method of claim 34, wherein said inner mirror of said first resonant cavity has a reflectivity of less than 5%, and wherein said inner mirror of said second resonant cavity has a reflectivity of less than 45%.

40. The method of claim 39, wherein said outer mirrors of said first and second resonant cavities each have a reflectivity of approximately 100%.

41. The method of claim 33, said step of interferometrically combining comprising the step of directing the input beam to said partially reflective surface, wherein an optical path length traversed by said first beam between said partially reflecting surface and said first resonant element differs from an optical path length traversed by said second beam between said partially reflecting surface and said second resonant element by an amount approximately equal to $c/(4\Delta f)$.

42. The method of claim 33, wherein said first path and said second path comprise an identical amount of optical material, whereby said output beam is stable against thermal variations that affect the index of refraction of the optical material.

43. A method comprising:
  causing an initial optical beam to impinge on a beam splitting device at an angle substantially less than 45° and thereby divide into at least a first and second optical input signals;
  processing each of said first and second optical input signals, said processing comprising phase modifications such that, when interferometrically recombined, shoulders of an input sequence of frequency bands for transmission of information in at least one of said first and second optical input signals are substantially preserved, to thereby produce respective first and second processed optical signals;
  combining the first and second processed optical signals with each other to produce first and second optical output signals;
  wherein information in a first output sequence of frequency bands is suppressed in at least one of said output signals; and
  wherein the first and second sequences of frequency bands match respective different subsets of said input sequence of frequency bands.

44. A method as in claim 43 in which said angle does not exceed 30°.

45. A method as in claim 43 in which said angle does not exceed 20°.

46. A method as in claim 43 in which said angle does not exceed 15°.

47. A method as in claim 43 in which said angle does not exceed 10°.

* * * * *